United States Patent
Teeneti et al.

(10) Patent No.: US 11,646,671 B1
(45) Date of Patent: May 9, 2023

(54) UNFOLDER-BASED SINGLE-STAGE AC-AC CONVERSION SYSTEM

(71) Applicants: Chakridhar Reddy Teeneti, North Logan, UT (US); Regan A. Zane, Hyde Park, UT (US); Hongjie Wang, North Logan, UT (US); Dorai Babu Yelaverthi, Raleigh, NC (US)

(72) Inventors: Chakridhar Reddy Teeneti, North Logan, UT (US); Regan A. Zane, Hyde Park, UT (US); Hongjie Wang, North Logan, UT (US); Dorai Babu Yelaverthi, Raleigh, NC (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 17/499,735

(22) Filed: Oct. 12, 2021

(51) Int. Cl.
*H02M 7/5395* (2006.01)
*H02M 5/293* (2006.01)
(Continued)

(52) U.S. Cl.
CPC ....... *H02M 5/2932* (2021.05); *H02M 1/4216* (2013.01); *H02M 5/225* (2013.01); *H02M 7/5395* (2013.01); *H02M 1/007* (2021.05)

(58) Field of Classification Search
CPC .. H02M 5/2932; H02M 1/4216; H02M 5/225; H02M 7/5395; H02M 1/007
See application file for complete search history.

(56) References Cited

U.S. PATENT DOCUMENTS 8,866,459 B2   10/2014   Zilberberg
10,917,019 B2   2/2021   Yelaverthi
(Continued)

FOREIGN PATENT DOCUMENTS

CN   103337968 A   10/2013
CN   106208727 A   12/2016
(Continued)

OTHER PUBLICATIONS

Teeneti et al., Unfolder-Based Single-Stage AC-AC Conversion System for Wireless Charging Applications, 2020 IEEE Energy Conversion Congress and Exposition (ECCE), Oct. 15, 2020, pp. 5193-5198, IEEE.
(Continued)

*Primary Examiner* — Adolf D Berhane
(74) *Attorney, Agent, or Firm* — Kunzler Bean & Adamson; Bruce R. Needham

(57) ABSTRACT

An power converter includes an unfolder connected to a three-phase source and has an output connection with a positive terminal, a negative terminal and a neutral terminal. The unfolder creates two unipolar piece-wise sinusoidal DC voltage waveforms offset by a half of a period. A three-input converter connected to the unfolder produces a quasi-sinusoidal output voltage across output terminals. Switches of the converter selectively connect the positive, negative and neutral inputs across the output terminals. A PWM controller controls a first duty ratio and a second duty ratio for the converter based on a phase angle of the source and a modulation index generated from an error signal related to a control variable. The duty ratios are time varying with a fundamental frequency of the source. The modulation index relates to output voltage of the converter, peak voltage or current of the source and/or peak current at the output terminals.

20 Claims, 10 Drawing Sheets

(51) Int. Cl.
H02M 5/22 (2006.01)
H02M 1/42 (2007.01)
H02M 1/00 (2006.01)

(56) References Cited

U.S. PATENT DOCUMENTS

| | | | |
|---|---|---|---|
| 2017/0323721 A1 | 11/2017 | Madawala | |
| 2020/0106303 A1 | 4/2020 | Thrimawithana | |
| 2020/0295663 A1* | 9/2020 | Yelaverthi | H02M 1/08 |
| 2021/0359595 A1* | 11/2021 | Everts | B60L 53/12 |
| 2021/0399629 A1* | 12/2021 | Everts | H02M 1/4225 |
| 2022/0190744 A1* | 6/2022 | Everts | H02M 7/797 |

FOREIGN PATENT DOCUMENTS

| | | |
|---|---|---|
| CN | 106535447 A | 3/2017 |
| CN | 206850503 A | 1/2018 |
| CN | 107896063 A | 4/2018 |

OTHER PUBLICATIONS

Chen et al., Isolated Bidirectional Grid-Tied Three-Phase AC-DC Power Conversion Using Series-Resonant Converter Modules and a Three-Phase Unfolder, IEEE Transactions on Power Electronics, Dec. 2017, pp. 9001-9012, vol. 32, No. 19, IEEE.

Yelaverthi et al., 3-Level Asymmetric Full-Bridge Soft-Switched PWM Converter for 3-Phase Unfolding Based Battery Charger Topology, 2019 IEEE Energy Conversion Congress and Exposition (ECCE), 2019, pp. 2737-2743, IEEE.

Soeiro et al., Swiss rectifier—A novel three-phase buck-type PFC topology for Electric Vehicle battery charging, 2012 Twenty-Seventh Annual IEEE Applied Power Electronics Conference and Exposition (APEC), 2012, pp. 2617-2624, IEEE.

Schrittwieser et al., Novel SWISS Rectifier Modulation Scheme Preventing Input Current Distortions at Sector Boundaries, Jul. 2017, pp. 5771-5785, vol. 32, No. 7, IEEE.

Zhang et al., Modulation Method and Control Strategy for Full-Bridge-Based Swiss Rectifier to Achieve ZVS Operation and Suppress Low-Order Harmonics of Injected Current, IEEE Transactions on Power Electronics, Jun. 2020, pp. 6512-6522, vol. 35, No. 6, IEEE.

Yelaverthi et al., Triple Active Bridge Series Resonant Converter for Three-Phase Unfolding Based Isolated Converters, IECON 2019—45th Annual Conference of the IEEE Industrial Electronics Society, 2019, pp. 4924-4930, IEEE.

Li et al., A Direct AC-AC Converter for Inductive Power-Transfer Systems, IEEE Transactions on Power Electronics, Feb. 2012, pp. 661-668, vol. 27, No. 2, IEEE.

* cited by examiner

Plot of phase voltage ($v_{an}$), and balanced 3-phase line currents ($i_a$, $i_b$ and $i_c$)

Plot of voltages and currents of the grid ($v_{an}$, $i_a$) and the resonant tank ($v_{xy}$, $I_{Pri}$), demonstrating the PFC action and tank voltage/current control Plot of soft DC-link voltages ($v_{po}$, $v_{on}$) and currents ($i_p$, $i_n$)

Plot of 5-level tank voltage ($v_{xy}$) at unequal $d_p$ and $d_n$ values

Plot of 3-level tank voltage ($v_{xy}$) at equal $d_{po}$ and $d_{on}$

US 11,646,671 B1

UNFOLDER-BASED SINGLE-STAGE AC-AC CONVERSION SYSTEM

GOVERNMENT LICENSE RIGHTS

This invention was made with government support under contract #DE-EE0008803 awarded by the Department of Energy. The government has certain rights in the invention.

FIELD

This invention relates to switching converters and more particularly relates to an unfolder-based single-stage AC to AC converter.

BACKGROUND

With the ongoing electrification of heavy-duty vehicles, there is a need for high-power charging systems. Wireless Power Transfer ("WPT") offers a convenient and safe way of charging electric vehicles by eliminating the use of high-voltage and high-current connectors. Conventional WPT converters use a two-stage approach consisting of an input Power Factor Correction ("PFC") stage with a stiff DC-link output followed by an inverter stage to drive a resonant tank. The stiff DC-link decouples the two power stages and offers easier and faster control. However, the limitations of this method include the need for bulky electrolytic DC-link capacitors and hard switching operation of the PFC stage. To overcome these limitations, single-stage AC-AC converters have been increasingly explored for conductive charging and WPT applications. Unlike in a two-stage converter, a single converter carries out both the PEC and the inverter action in a single-stage system. However, most existing single-stage systems have serious drawbacks. In addition, other applications that drive a resonant circuit also typically include a two-stage approach and also include the same problems as WPT applications. For example, the two-stage approach is also often used for conductive charge applications with a tightly coupled transformer and other applications like power supplies for welding.

SUMMARY

A power converter for an unfolder-based single AC to AC converter includes an unfolder with an input connection that has three input terminals that connect to a three-phase alternating current ("AC") power source and that has an output connection with a positive terminal, a negative terminal and a neutral terminal. The unfolder unfolds bipolar AC voltages into two unipolar piece-wise sinusoidal direct current ("DC") voltage waveforms offset from each other by a half of a period. The power converter includes a three-input converter that produces a quasi-sinusoidal output voltage across output terminals at an output frequency. The three-input converter has a positive input connection connected to the positive terminal, a negative input connection connected to the negative terminal and a neutral input connection connected to the neutral terminal. The three-input converter includes switches that selectively connect the positive, negative and neutral input connections across the output terminals. The power converter includes a pulse-width modulation controller configured to control a first duty ratio $d_{po}$ and a second duty ratio $d_{on}$ for the three-input converter as a function of a phase angle of a phase of the three-phase AC power source and a modulation index generated from an error signal related to a control variable compared to a reference. The first duty ratio $d_{po}$ and the second duty ratio $d_{on}$ are time varying at a rate related to a fundamental frequency of the three-phase AC power source, and the modulation index relates to output voltage of the three-input converter, a peak voltage of the three-phase AC power source, a peak current of the three-phase AC power source and/or a peak current of output current at the output terminals.

A system for an unfolder-based single AC to AC converter includes an unfolder with an input connection that has three input terminals that connect to a three-phase AC power source and that has an output connection with a positive terminal, a negative terminal and a neutral terminal. The unfolder unfolds bipolar AC voltages into two unipolar piece-wise sinusoidal DC voltage waveforms offset from each other by a half of a period. The system includes a three-input converter that produces a quasi-sinusoidal output voltage across output terminals at an output frequency. The three-input converter includes a positive input connection connected to the positive terminal, a negative input connection connected to the negative terminal and a neutral input connection connected to the neutral terminal. The three-input converter includes switches that selectively connect the positive, negative and neutral input connections across the output terminals. The system includes a wireless power transfer ("WPT") primary pad coupled to output terminals of the three-input converter, a WPT secondary pad electromagnetically coupled to the WPT primary pad over a gap, and a rectifier section coupled to an output of the WPT secondary pad. The rectifier section has an output. The system includes a pulse-width modulation controller configured to control a first duty ratio $d_{po}$ and a second duty ratio $d_{on}$ for the three-input converter as a function of a phase angle of a phase of the three-phase AC power source and a modulation index generated from an error signal related to a converter output variable compared to a reference. The converter output variable is from the output of the rectifier section. The first duty ratio $d_{po}$ and the second duty ratio $d_{on}$ are time varying at a rate related to a fundamental frequency of the three-phase AC power source, and the modulation index relates to output voltage of the three-input converter, a peak voltage of the three-phase AC power source, a peak current of the three-phase AC power source and/or a peak current of output current at the output terminals.

A method for operation of an unfolder-based single AC to AC converter includes receiving input power at three input terminals of an unfolder. The three input terminals receive the power from a three-phase AC power source and, the unfolder includes an output connection with a positive terminal, a negative terminal and a neutral terminal. The unfolder unfolds bipolar AC voltages into two unipolar piece-wise sinusoidal DC voltage waveforms offset from each other by a half of a period. The method includes receiving output power from the unfolder at a three-input converter that produces a quasi-sinusoidal output voltage across output terminals at an output frequency. The three-input converter receives the output power at a positive input connection connected to the positive terminal, a negative input connection connected to the negative terminal and a neutral input connection connected to the neutral terminal. The three-input converter includes switches that selectively connect the positive, negative and neutral input connections across the output terminals. The method includes controlling, with a pulse-width modulation controller, a first duty ratio $d_{po}$ and a second duty ratio $d_{on}$ for the three-input converter as a function of a phase angle of a phase of the three-phase AC power source and a modulation index generated from an error signal related to a control variable compared to a reference. The first duty ratio $d_{po}$ and the second duty ratio $d_{on}$ are time varying at a rate related to a fundamental frequency of the three-phase AC power source, and the modulation index relates to output voltage of the three-input converter, a peak voltage of the three-phase AC power source, a peak current of the three-phase AC power source and/or a peak current of output current at the output terminals.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
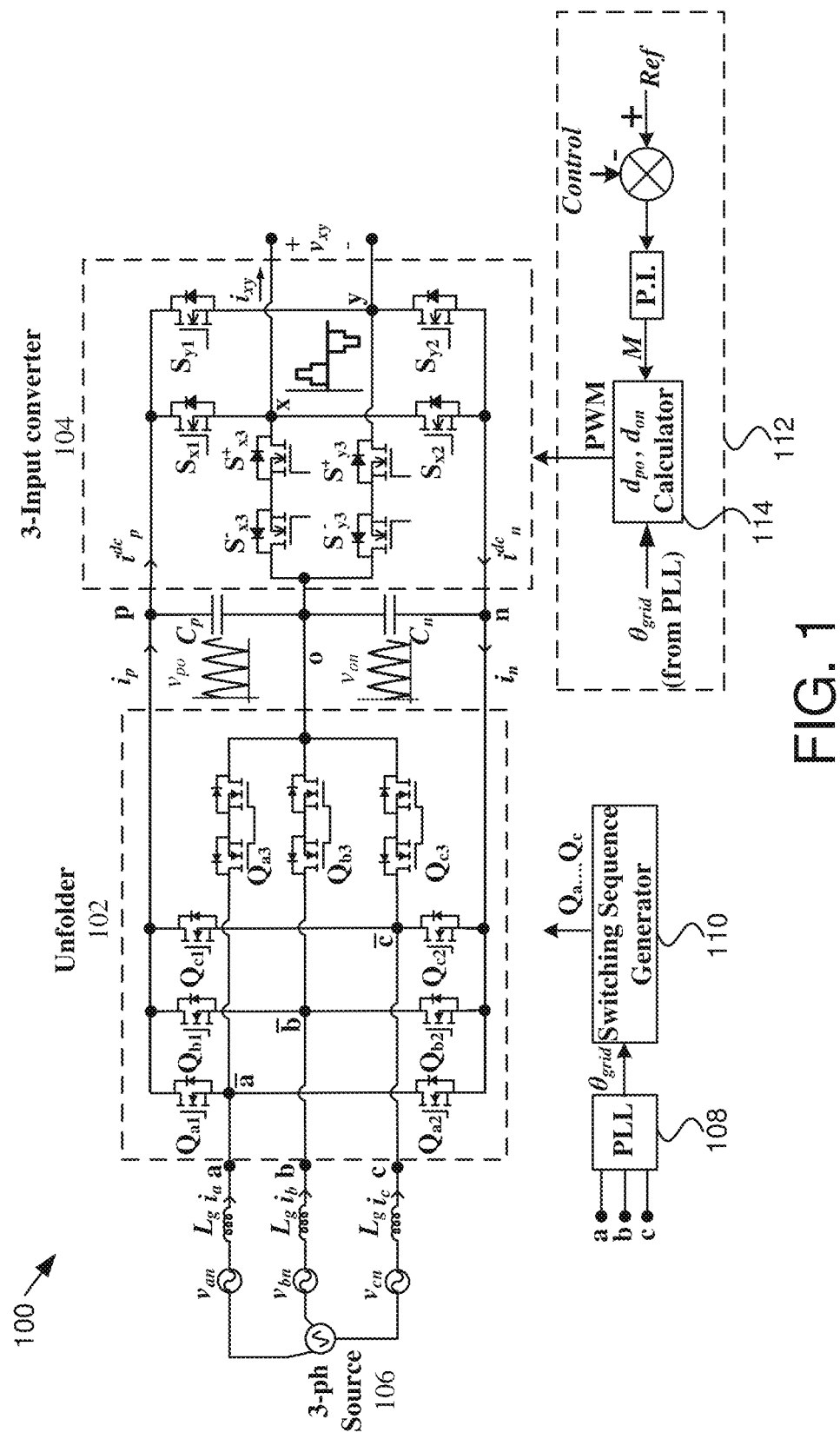
FIG. 1 is a schematic block diagram illustrating one embodiment of an unfolder-based single-stage AC to AC converter.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom very large scale integrated ("VLSI") circuits or gate arrays, off-the-shelf semiconductors such as logic chips, transistors, or other discrete components. A module may also be implemented in programmable hardware devices such as a field programmable gate array ("FPGA"), programmable array logic, programmable logic devices or the like.

Modules may also be implemented in software for execution by various types of processors and/or controllers. As used herein, execution of program code by a processor also refers to execution by a controller. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor/controller to carry out aspects of the present invention.

The computer readable storage medium is a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program code may execute entirely on a user's computing device/controller, partly on the user's computing device/controller, as a stand-alone software package, or partly on the user's computing device/controller and partly on a remote computer. In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes q'c') only A, only B or only C and excludes combinations of A, B and C.

An power converter for an unfolder-based single AC to AC converter includes an unfolder with an input connection that has three input terminals that connect to a three-phase alternating current ("AC") power source and that has an output connection with a positive terminal, a negative terminal and a neutral terminal. The unfolder unfolds bipolar AC voltages into two unipolar piece-wise sinusoidal direct current ("DC") voltage waveforms offset from each other by a half of a period. The power converter includes a three-input converter that produces a quasi-sinusoidal output voltage across output terminals at an output frequency. The three-input converter has a positive input connection connected to the positive terminal, a negative input connection connected to the negative terminal and a neutral input connection connected to the neutral terminal. The three-input converter includes switches that selectively connect the positive, negative and neutral input connections across the output terminals. The power converter includes a pulse-width modulation controller configured to control a first duty ratio $d_{po}$ and a second duty ratio $d_{on}$ for the three-input converter as a function of a phase angle of a phase of the three-phase AC power source and a modulation index generated from an error signal related to a control variable compared to a reference. The first duty ratio $d_{po}$ and the second duty ratio $d_{on}$ are time varying at a rate related to a fundamental frequency of the three-phase AC power source, and the modulation index relates to output voltage of the three-input converter, a peak voltage of the three-phase AC power source, a peak current of the three-phase AC power source and/or a peak current of output current at the output terminals.

In some embodiments, a modulation scheme for switches of the three-input converter depends on the first duty ratio $d_{po}$ and the second duty ratio $d_{on}$. In other embodiments, the modulation scheme includes a first modulation scheme when $d_{po}$ is greater than $d_{on}$ and a second modulation scheme when $d_{on}$ is greater than $d_{po}$. In other embodiments, the modulation scheme includes switching of the switches of the three-input converter to produce a positive output voltage at the output terminals during a first half of a switching period of the three-input converter and to produce a negative output voltage at the output terminals during a second half of a switching period of the three-input converter.

In some embodiments, equations defining the first duty ratio $d_{po}$ and the second duty ratio $d_{on}$ include first sector equations for a first sector and second sector equations for a second sector. The first sector is when voltage from the positive terminal to the neutral terminal $v_{po}$ is decreasing and voltage from the neutral terminal to the negative terminal $v_{on}$ is increasing and the second sector is when $v_{po}$ is increasing and $v_{on}$ is decreasing. In other embodiments, first and second sector equations for the first duty ratio $d_{po}$ and the second duty ratio $d_{on}$ are defined as:

$$d_{po} = \frac{2}{\pi}\sin^{-1}(M\cos\theta_{grid})$$

for the first sector;

$$d_{po} = \frac{2}{\pi}\sin^{-1}\left(M\cos\left(\theta_{grid} - \frac{\pi}{6}\right)\right)$$

for the second sector;

$$d_{on} = \frac{2}{\pi}\sin^{-1}(M\sin(\theta_{grid}))$$

for the first sector; and $$d_{on} = \frac{2}{\pi}\sin^{-1}\left(M\sin\left(\theta_{grid} - \frac{\pi}{6}\right)\right)$$

for the second sector,
where $\theta_{grid}$ is the phase angle of the phase of the three-phase AC power source, and M is the modulation index.

In some embodiments, the modulation index M is:

$$M = \frac{V_{xy1(rms)}}{V_{xy1(rms)max}} = \frac{V_{xy1(rms)}\pi}{\sqrt{6}\,V_m} = \frac{I_m\pi}{2I_{Lsm}\cos(\psi)}$$

where:
$V_{xy1(rms)}$ is a root-mean-square ("rms") of the fundamental component of the output voltage of the three-input converter;
$V_{xy1(rms)max}$ is a maximum rms voltage of the three-input converter;
$V_m$ is the peak voltage of the three-phase AC power source;
$I_m$ is the peak current of the three-phase AC power source;
$I_{Lsm}$ is the peak current of output current at the output terminals; and
$\psi$ is the phase angle between the fundamental components of $v_{xy}$ and $i_{xy}$.

In other embodiments, the pulse-width modulation controller controls switching of the three-input converter to maintain unity power factor at the input to the unfolder. In other embodiments, a switching frequency of the three-input converter is at least two orders of magnitude higher than a fundamental frequency of the three-phase AC power source.

In some embodiments, $d_{po}$ and $d_{on}$ are centered at a phase angle of 90 degrees of a switching period of the three-input converter for a positive output voltage at the output terminals and are centered at a phase angle of 270 degrees of the switching period of the three-input converter for a negative output voltage at the output terminals. In other embodiments, the output terminals of the three-input converter are connected to a resonant section which connects to a rectification section and an output of the rectification section is a DC voltage and the control variable is for controlling the output of the rectification section. In other embodiments, the resonant section includes a transmission pad separated from a receiver pad on a mobile device, where the transmission pad transfers power over a gap to the receiver pad as part of a wireless power transmission system, the resonant section includes a transformer and the power converter is a DC power supply, and the resonant section includes output terminals and the power converter is an inverter.

A system for an unfolder-based single AC to AC converter includes an unfolder with an input connection that has three input terminals that connect to a three-phase AC power source and that has an output connection with a positive terminal, a negative terminal and a neutral terminal. The unfolder unfolds bipolar AC voltages into two unipolar piece-wise sinusoidal DC voltage waveforms offset from each other by a half of a period. The system includes a three-input converter that produces a quasi-sinusoidal output voltage across output terminals at an output frequency. The three-input converter includes a positive input connection connected to the positive terminal, a negative input connection connected to the negative terminal and a neutral input connection connected to the neutral terminal. The three-input converter includes switches that selectively connect the positive, negative and neutral input connections across the output terminals. The system includes a wireless power transfer ("WPT") primary pad coupled to output terminals of the three-input converter, a WPT secondary pad electromagnetically coupled to the WPT primary pad over a gap, and a rectifier section coupled to an output of the WPT secondary pad. The rectifier section has an output. The system includes a pulse-width modulation controller configured to control a first duty ratio $d_{po}$ and a second duty ratio $d_{on}$ for the three-input converter as a function of a phase angle of a phase of the three-phase AC power source and a modulation index generated from an error signal related to a converter output variable compared to a reference. The converter output variable is from the output of the rectifier section. The first duty ratio $d_{po}$ and the second duty ratio $d_{on}$ are time varying at a rate related to a fundamental frequency of the three-phase AC power source, and the modulation index relates to output voltage of the three-input converter, a peak voltage of the three-phase AC power source, a peak current of the three-phase AC power source and/or a peak current of output current at the output terminals.

In some embodiments, a modulation scheme for switches of the three-input converter depends on the first duty ratio $d_{po}$ and the second duty ratio $d_{on}$. The modulation scheme includes a first modulation scheme when $d_{po}$ is greater than $d_{on}$ and a second modulation scheme when $d_{on}$ is greater than $d_{po}$, and the modulation scheme includes switching of the switches of the three-input converter to produce a positive output voltage at the output terminals during a first half of a switching period of the three-input converter and to produce a negative output voltage at the output terminals during a second half of a switching period of the three-input converter. In other embodiments, the output variable is one of output power, output voltage and output current of the rectification section.

In other embodiments, equations defining the first duty ratio $d_{po}$ and the second duty ratio $d_{on}$ include first sector equations for a first sector and second sector equations for a second sector. The first sector is when voltage from the positive terminal to the neutral terminal $v_{po}$ is decreasing and voltage from the neutral terminal to the negative terminal $v_{on}$ is increasing and the second sector is when $v_{po}$ is increasing and $v_{on}$ is decreasing. In other embodiments, first and second sector equations for the first duty ratio $d_{po}$ and the second duty ratio $d_{on}$ are defined as:

$$d_{po} = \frac{2}{\pi}\sin^{-1}(M\cos\theta_{grid})$$

for the first sector;

$$d_{po} = \frac{2}{\pi}\sin^{-1}\left(M\cos\left(\theta_{grid} - \frac{\pi}{6}\right)\right)$$

for the second sector;

$$d_{on} = \frac{2}{\pi}\sin^{-1}(M\sin(\theta_{grid}))$$

for the first sector; and $$d_{on} = \frac{2}{\pi}\sin^{-1}\left(M\sin\left(\theta_{grid} - \frac{\pi}{6}\right)\right)$$

for the second sector,
where $\theta_{grid}$ is the phase angle of the phase of the three-phase AC power source, and M is the modulation index, and the modulation index M is:

$$M = \frac{V_{xy1(rms)}}{V_{xy1(rms)max}} = \frac{V_{xy1(rms)}\pi}{\sqrt{6}\,V_m} = \frac{I_m\pi}{2I_{Lsm}\cos(\psi)}$$

where:
$V_{xy1(rms)}$ is a root-mean-square ("rms") voltage and is the output voltage of the three-input converter,
$V_{xy1(rms)max}$ is a maximum rms voltage of the three-input converter,
$V_m$ is the peak voltage of the three-phase AC power source,
$I_m$ is the peak current of the three-phase AC power source,
$I_{Lsm}$ is the peak current of output current at the output terminals,
$\psi$ is the phase angle between the fundamental components of $v_{xy}$ and $i_{xy}$.

A method for operation of an unfolder-based single AC to AC converter includes receiving input power at three input terminals of an unfolder. The three input terminals receive the power from a three-phase AC power source and, the unfolder includes an output connection with a positive terminal, a negative terminal and a neutral terminal. The unfolder unfolds bipolar AC voltages into two unipolar piece-wise sinusoidal DC voltage waveforms offset from each other by a half of a period. The method includes receiving output power from the unfolder at a three-input converter that produces a quasi-sinusoidal output voltage across output terminals at an output frequency. The three-input converter receives the output power at a positive input connection connected to the positive terminal, a negative input connection connected to the negative terminal and a neutral input connection connected to the neutral terminal. The three-input converter includes switches that selectively connect the positive, negative and neutral input connections across the output terminals. The method includes controlling, with a pulse-width modulation controller, a first duty ratio $d_{po}$ and a second duty ratio $d_{on}$ for the three-input converter as a function of a phase angle of a phase of the three-phase AC power source and a modulation index generated from an error signal related to a control variable compared to a reference. The first duty ratio $d_{po}$ and the second duty ratio $d_{on}$ are time varying at a rate related to a fundamental frequency of the three-phase AC power source, and the modulation index relates to output voltage of the three-input converter, a peak voltage of the three-phase AC power source, a peak current of the three-phase AC power source and/or a peak current of output current at the output terminals.

In some embodiments, the method includes modulating switches of the three-input converter according to a modulation scheme that depends on the first duty ratio $d_{po}$ and the second duty ratio $d_{on}$, and the method selects a first part of the modulation scheme when $d_{po}$ is greater than $d_{on}$ and a second part of the modulation scheme when $d_{on}$ is greater than $d_{po}$, and the modulation scheme includes switching of the switches of the three-input converter to produce a positive output voltage at the output terminals during a first half of a switching period of the three-input converter and to produce a negative output voltage at the output terminals during a second half of a switching period of the three-input converter. In other embodiments, equations defining the first duty ratio $d_{po}$ and the second duty ratio $d_{on}$ include first sector equations for a first sector and second sector equations for a second sector. The first sector is when voltage from the positive terminal to the neutral terminal $v_{po}$ is decreasing and voltage from the neutral terminal to the negative terminal $v_{on}$ is increasing and the second sector is when $v_{po}$ is increasing and $v_{on}$ is decreasing.

I. Operation of the Proposed Ac-Ac Converter

FIG. 1 is a schematic block diagram illustrating one embodiment of an unfolder-based single-stage AC to AC converter 100. The converter 100 includes an unfolder 102 and a three-input converter 104 with output terminals x and y with an output voltage V. The converter 100 is fed from a three-phase AC power source 106 (or three-phase source 106 for simplicity). The unfolder 102 is controlled by a phase lock loop ("PLL") 108 connected to the three-phase source 106 where the PLL 108 is connected to a switching sequence generator 110 that controls the switches Qa1, Qb1, Qc1, Qa2, Qb2, Qc2, Qa3, Qb3, Qc3 of the unfolder 102. The switching sequence of the unfolder 102 is described in more detail with respect to FIG. 3. The three-input converter 104 is controlled by a pulse-width modulation ("PWM") controller 112. The PWM controller 112 includes a duty cycle calculator 114 that has an input of a phase angle ($\theta_{grid}$) of the three-phase source 106 from the PLL 108 and a modulation index M. The modulation index M is generated from an error signal from a control variable compared with a reference and multiplied by a control loop compensation, such as proportional-integral compensation (as depicted in FIG. 1). The control loop compensation may be a proportional-integral ("PI") compensation, proportional compensation, a proportional-integral-derivative ("PID") compensation, or other suitable compensation. The PWM controller 112 is described in more detail below.

The unfolder 102 has an input that connects to the three-phase source 106 and has an output connection with a positive terminal p, a negative terminal n and a neutral terminal o. The unfolder 102 unfolds bipolar AC voltages into two unipolar piece-wise sinusoidal DC voltage waveforms offset from each other by a half of a period. The unipolar piece-wise sinusoidal DC voltage waveforms are described with regard to FIG. 3.

The three-input converter 104 produces a quasi-sinusoidal output voltage $v_{xy}$ across output terminals x and y at an output frequency. Typically the output frequency of the three-input converter 104 is much higher than the fundamental frequency of the three-phase source 106, which is typically 60 hertz ("Hz") or 50 Hz. In some embodiments, the output frequency of the three-input converter 104 is two orders of magnitude greater than fundamental frequency of the three-phase source 106. In some instances, the output frequency of the three-input converter 104 is two orders of magnitude greater than fundamental frequency of the three-phase source 106 of about 10 kilo hertz ("kHz") to 300 kHz. In some embodiments, a switching frequency of the switches of the three-input converter 104 is about 85 kHz and produces a quasi AC waveform related to the switching frequency. The three-input converter 104 includes a positive input connection connected to the positive terminal p, a negative input connection connected to the negative terminal n and a neutral input connection connected to the neutral terminal o. The three-input converter 104 includes switches that selectively connect the positive, negative and neutral input connections across the output terminals x and y.

In some embodiments, the control variable is the output voltage $v_{xy}$ of the three-input converter 104. In other embodiments, the output of the three-input converter 104 feeds a filter that reduces harmonics of the three-input converter 104 and the control variable is an output of the filter. In other embodiments, the three-input converter 104 feeds a resonant section, which is connected to a rectification section that feeds a DC load and the control variable is the output voltage of the rectification section. In some embodiments, the converter 100 of FIG. 1 is part of a converter in a WPT system, such as the WPT system 200 of FIG. 2.

The PWM controller 112 is configured to control a first duty ratio $d_{po}$ and a second duty ratio $d_{on}$ for the three-input converter 104 as a function of the phase angle $\theta_{grid}$ of a phase (e.g. phase "a") of the three-phase source 106 and the modulation index M generated from an error signal related to a control variable compared to a reference. The first duty ratio $d_{po}$ and the second duty ratio $d_{on}$ are time varying at a rate related to a fundamental frequency of the three-phase source 106 and, in various embodiments, the modulation index M relates to the output voltage $v_{xy}$ of the three-input converter 104, a peak voltage $V_m$ of the three-phase source 106, a peak current $I_m$ of the three-phase source 106 and/or a peak current $I_{m\_xy}$ of output current at the output terminals x, y.

Figure 2:
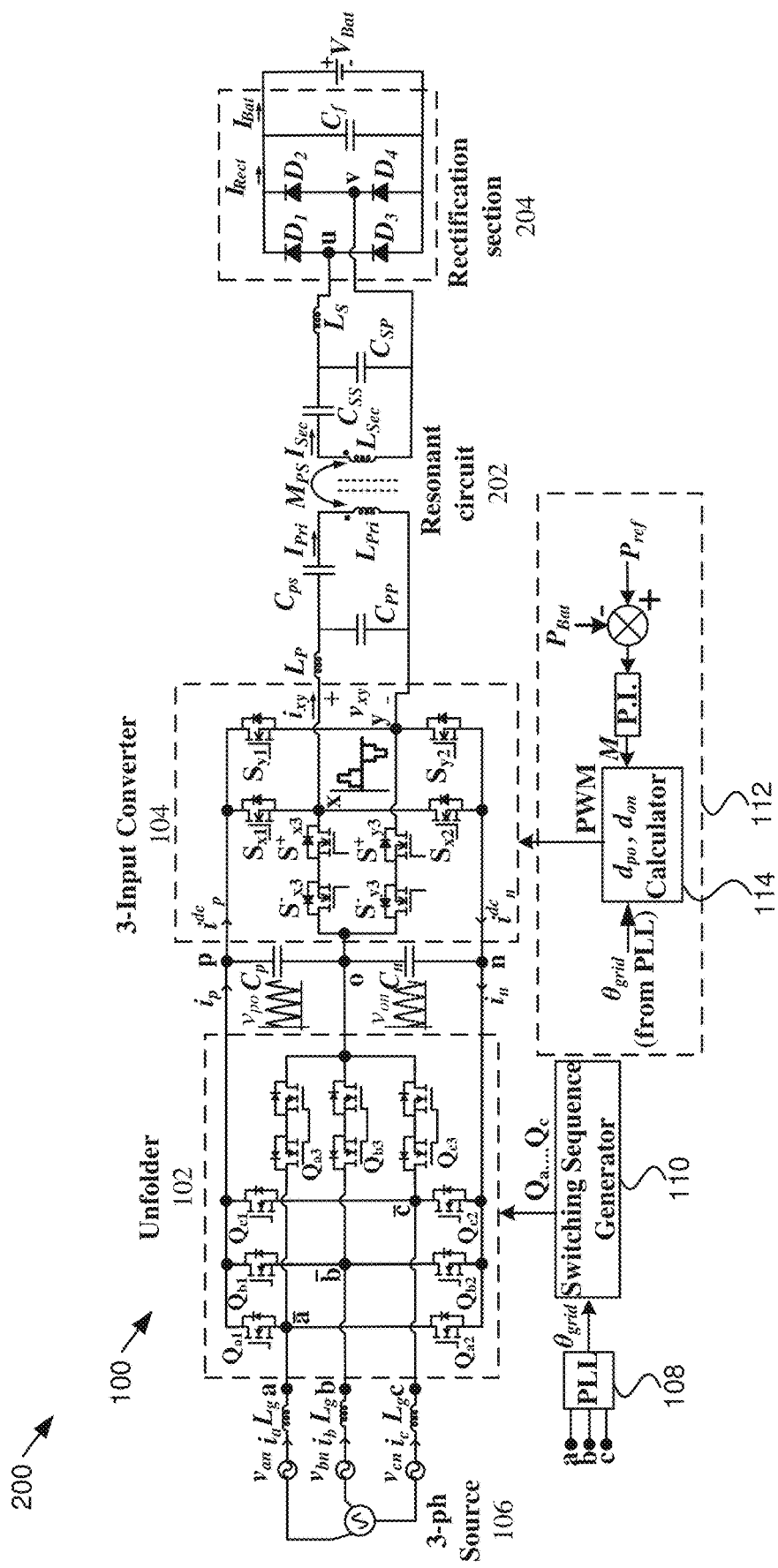
FIG. 2 is a schematic block diagram illustrating one embodiment of an unfolder-based single-stage AC to AC converter implemented in a wireless power transfer system.
Figure 3:
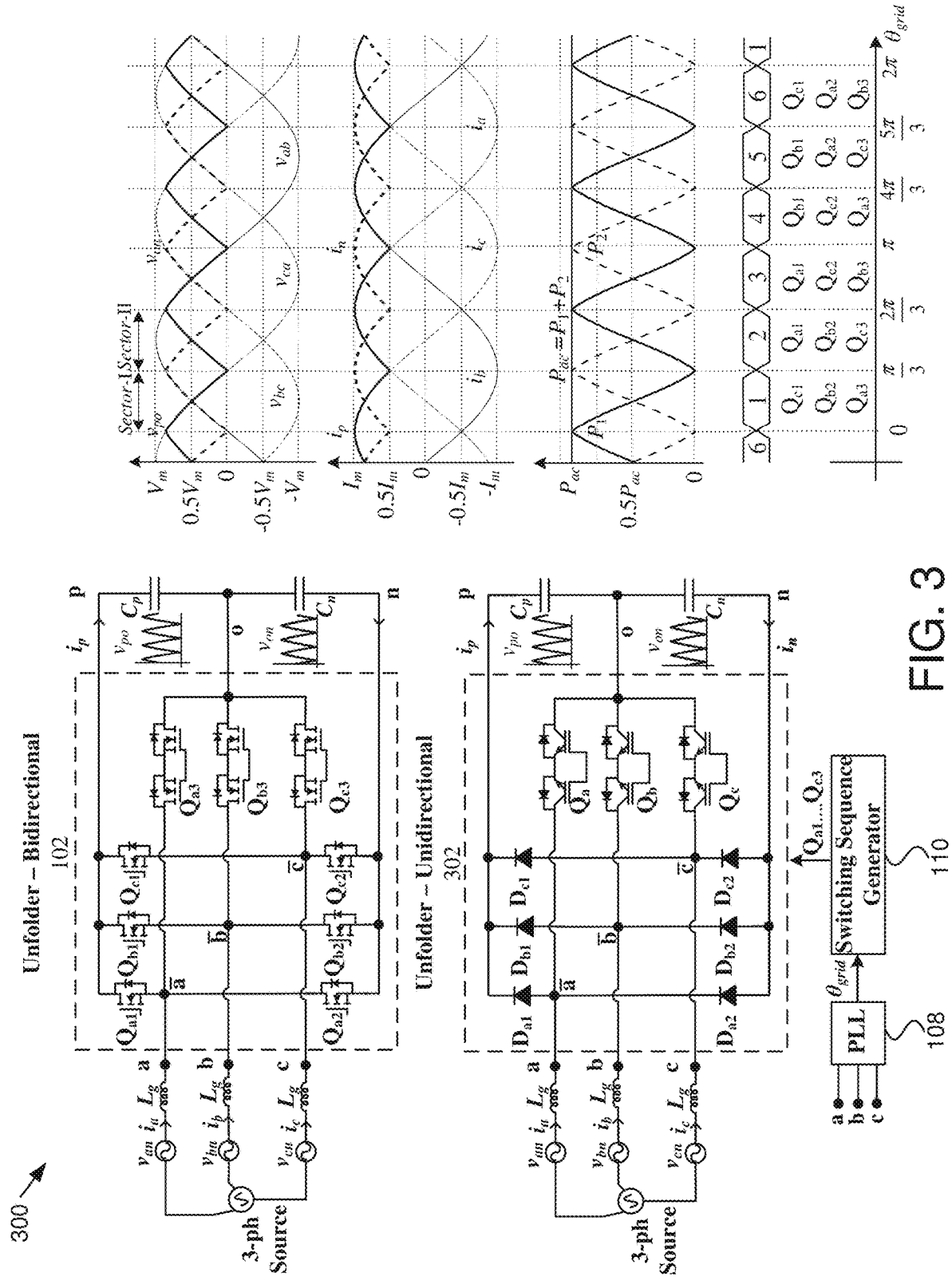
FIG. 3 is a schematic block diagram illustrating one embodiment of an unfolder along with a switching sequence and ideal waveforms of a three-phase unfolder operating at unity power factor.

FIG. 2 is a schematic block diagram illustrating one embodiment of an unfolder-based single-stage AC to AC converter 200 implemented in a wireless power transfer ("WPT) system 200. The circuit diagram of FIG. 2 is a single-stage AC-AC resonant topology with a three-phase unfolder 102 and a three-input, T-type converter 104 (which may be referred to herein as a three-input converter 104 or a T-type converter 104). FIG. 3 is a schematic block diagram 300 illustrating one embodiment of an unfolder 102 along with a switching sequence and ideal waveforms of a three-phase unfolder 102 operating at unity power factor. The three-input converter 104 is connected to a resonant circuit 202, which connects to a rectification section 204 connected to a battery. For wireless power transfer, the resonant circuit 202 includes a primary pad, represented by a primary inductor $L_{pri}$ separated from a secondary pad, represented by a secondary inductor $L_{pri}$ where the primary pad and secondary pad are separated by a gap. The primary pad and the secondary pad are coupled with a mutual inductance $M_{PS}$. For example, the primary pad may be ground mounted and the secondary pad, rectification section 204 and battery may be on an electric vehicle that is positioned with the secondary pad over the primary pad for charging the battery.

In the WPT system 200 of FIG. 2, the control variable for the PWM controller 112 is power $P_{bat}$ transferred to the battery, which is calculated from a battery current $I_{bat}$ multiplied by battery voltage $V_{bat}$. The power to the battery is compared with a power reference $P_{ref}$. In some embodiments, the power reference $P_{ref}$ is based on a state-of-charge of the battery and is generated by a battery charging controller on the vehicle and is transferred along with the power to the battery $P_{bat}$ through a wireless communication link. While a WPT system 200 is depicted in FIG. 2, the converter 100 may be used for various other applications to provide or sink power.

The unfolder 102 is depicted with switches Qa1, Qb1, Qc1, Qa2, Qb2, Qc2, Qa3, Qb3, Qc3 for bi-directional power transfer. In some embodiments, switches Qa1, Qb1, Qc1, Qa2, Qb2, and Qc2 may be replaced by diodes Da1, Db1, Dc1, Da2, Db2, and Dc2, as depicted in the bottom unfolder 302 of FIG. 3 for unidirectional power transfer. In other embodiments, the unfolder 102 with switches may also be used for unidirectional power transfer.

The unfolder 102 of the power converter 100 and WPT system 200 of FIGS. 1 and 2 are depicted in FIG. 3 and the incoming AC phases can be connected to positive, negative, or midpoint of a soft DC-link using the switching sequence shown in FIG. 3. The soft DC-link is depicted in FIGS. 1 and 2 at the output of the unfolder 102 at terminals p, n and o. The three input phases each at a time of a maximum and minimum instantaneous voltage are connected to the positive p and negative n points of the soft DC-link respectively and the remaining phase is connected to the midpoint o. This switching sequence results in the time-varying soft DC-link voltages $v_{po}$ and $v_{on}$, which are the respectively the voltages across the p and o terminals of the DC-link and the o and n terminals of the DC-link of the three-input converter 104. For example, in the first switching period (marked with a "1") in switching diagram of FIG. 3, from time 0 to π/3 switch Qc1 connects phase c of the three-phase source 106 to terminal p, switch Qb2 connects phase b to terminal n and switch Qa3 connects phase a to terminal o. This switching combination then connects the voltage across phases c and a ($v_{ca}$) across terminals p and o so $v_{ca}=v_{po}$ and connects the voltage across phases a and b ($v_{ab}$) across terminals o and n so $v_{ab}=v_{on}$, as can be seen in the voltage waveform at the top right side of FIG. 3.

In the waveforms on the right side of FIG. 3, $v_{ab}$ is a voltage across input terminals a and b of the unfolder 102, $v_{bc}$ is a voltage across the input terminals b and c of the unfolder 102, and $v_{ca}$ is a voltage across the input terminals c and a of the unfolder 102. Voltages $V_m$ and $-V_m$ are respectively a maximum and a minimum instantaneous voltage of each input phase from the three-phase source 106. Note that $v_{po}$ and $v_{on}$ are unipolar piece-wise sinusoidal DC voltage waveforms offset from each other by a half of a period. The frequency of the unipolar piece-wise sinusoidal DC voltage waveforms is three times the fundamental frequency of the three-phase source 106. The unipolar piece-wise sinusoidal DC voltage waveforms includes a DC component that is about half of the maximum instantaneous voltage $V_m$.

The middle waveform on the right side of FIG. 3 depicts phase currents, current to terminal p $i_p$ and current to terminal n $i_n$. The bottom waveform of the three waveforms at the right side of FIG. 3 shows power waveforms generated by the voltage and current waveforms at the output terminals p, n, and o of the unfolder 102. Power $P_1$ is $v_{po}*i_p$ and power $P_2$ is $v_{on}*i_n$. Note that the output power $P_{ac}$ of the unfolder 102 is constant.

Switches $Q_{a3}$, $Q_{b3}$ and $Q_{c3}$ are two complimentary insulated metal-oxide semiconductor field-effect transistor ("MOSFETs") switches in series to prevent current in either direction through a body diode the switches $Q_{a3}$, $Q_{b3}$ and $Q_{c3}$ when turned off. In other embodiments, other types of semiconductor switches are used, such as gate bipolar transistors ("IGBTs") switches may be used. In other embodiments, a switch pair may be replaced by a single switch where a body diode is not included with the switch. The capacitors across terminals p and o $C_p$ and across terminals o and n $C_n$ may be film-type capacitors, which are smaller and more reliable than the electrolytic capacitors of multi-stage AC-AC inverters and other topologies, which is beneficial.

The three-input converter 104, which is a T-type topology, converts the soft DC-link voltages $v_{po}$ and $v_{on}$ into a high-frequency 5-level voltage. Although, the powers P1 ($v_{po}*i_p$) and P2 ($v_{on}*i_n$) across the soft DC-link are time-varying between 0 and $P_{ac}$ as shown in FIG. 3, the output power of the T-type converter 104 is constant over a switching cycle. This AC-AC topology of the converter 100 provides a buck-type power factor correction ("PFC") action and regulates the fundamental component of the output voltage $v_{xy}$, which is the input voltage to the resonant tank of the WPT system 200 of FIG. 2, over the entire grid cycle. The soft switching of the unfolder 102 switches at a unity power factor and results in negligible switching losses. The T-type converter 104 performs both power factor correction and output current control, thus affecting the overall system operation. Hence, it is referred to as a single-stage power conversion system.

II. Modulation Strategy And Control Scheme

Figure 4:
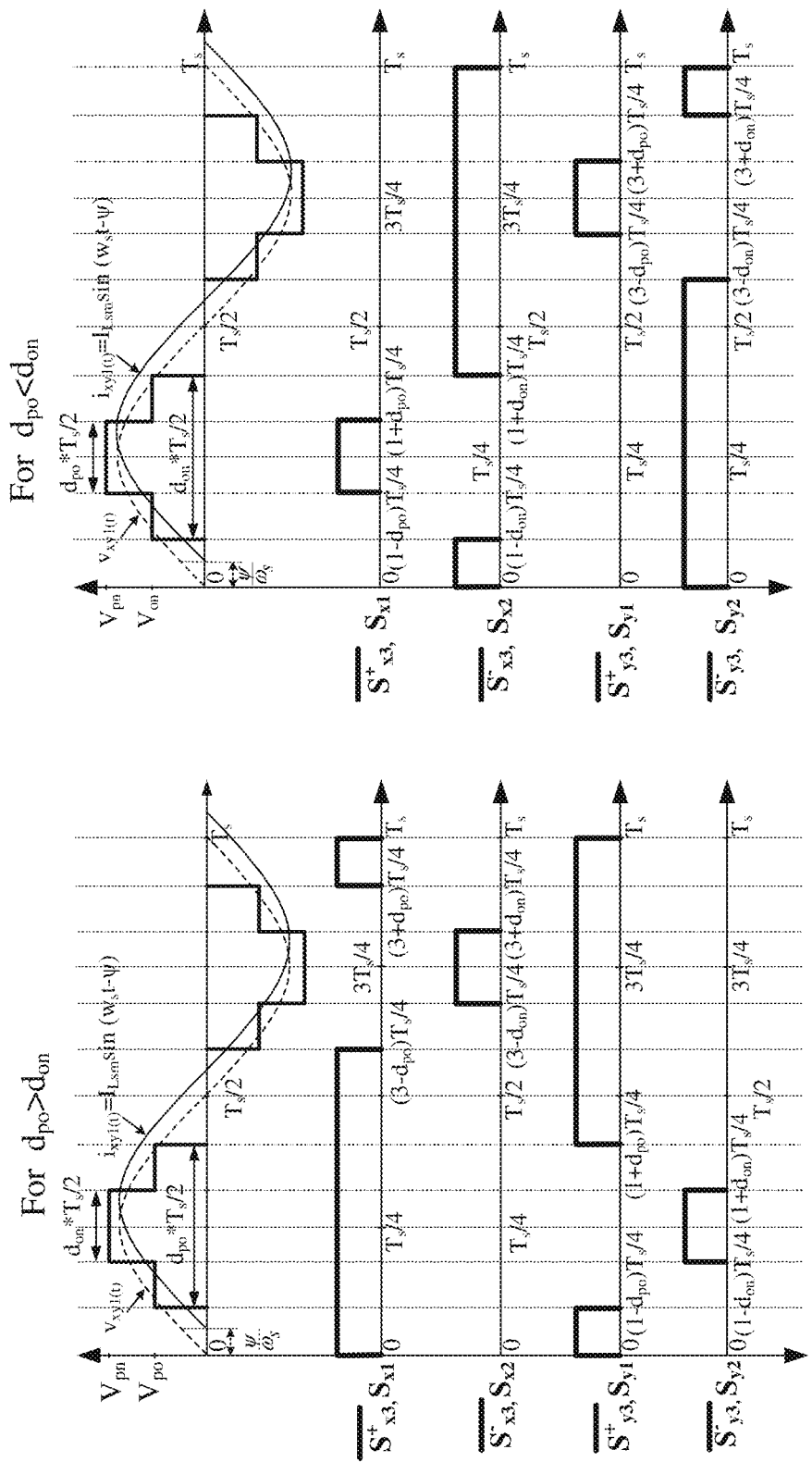
FIG. 4 is a modulation scheme of a three-input converter for a first duty ratio $d_{po}$ greater than a second duty ratio $d_{on}$ and for the first duty ratio $d_{po}$ less than the second duty ratio $d_{on}$.

The three-phase unfolder 102 is switched at twice the line frequency of the three-phase source 106 with the sequence presented in FIG. 3. The T-type converter 104 switches at the operating frequency of the WPT system 200. A modulation scheme and switching sequence for the T-type converter 104 is shown in FIG. 4, where a first duty ratio $d_{po}$ and a second duty ratio $d_{on}$ are the duty ratios corresponding to the soft DC-link voltages $v_{po}$ and $v_{on}$, respectively. The modulation scheme for switches of the three-input converter 104 depends on the first duty ratio $d_{po}$ and the second duty ratio $d_{on}$. The modulation scheme includes a first modulation scheme when $d_{po}$ is greater than $d_{on}$ and a second modulation scheme when $d_{on}$ is greater than $d_{po}$. The left waveform is the first modulation scheme for $d_{po} > d_{on}$ and the right waveform is the second modulation scheme for $d_{po} < d_{on}$.

The modulation scheme includes switching of the switches (e.g. $S_{x1}$, $S_{y1}$, $S_{x2}$, $S_{y2}$, $S^+_{x3}$, $S^-_{x3}$, $S^+_{y3}$, $S^-_{y3}$) of the three-input converter 104 to produce a positive output voltage at the output terminals $v_{xy}$ during a first half of a switching period of the three-input converter 104 and to produce a negative output voltage $v_{xy}$ at the output terminals during a second half of a switching period of the three-input converter 104. The notation for each of the waveforms includes a main switch and a complimentary switch. For example, when $S_{x1}$ is high, $S^+_{x3}$ is low, when $S_{x2}$ is high, $S^-_{x3}$ is low, when $S_{y1}$ is high, $S^+_{y3}$ is low, and when $S_{y2}$ is high, $S^-_{y3}$ is low, and vice-versa.

The voltage pulses corresponding to $v_{po}$ and $v_{on}$ are center-aligned in the depicted embodiments such that $d_{po}$ and $d_{on}$ are centered at a phase angle of 90 degrees of a switching period of the three-input converter 104 for a positive output voltage $v_{xy}$ at the output terminals and are centered at a phase angle of 270 degrees of the switching period of the three-input converter 104 for a negative output voltage $v_{xy}$ at the output terminals. In other embodiments, the modulation scheme includes voltage pulses that are not center aligned. The duty ratios $d_{po}$ and $d_{on}$ of the 3-input, T-type converter 104 are modulated to achieve the PFC action and output voltage ($v_{xy}$) regulation. Voltages $v_{po}$ and $v_{on}$ vary at three times the line frequency. This causes $d_{po}$ and $d_{on}$ to vary at three times the line frequency as well, which is a rate much slower than the switching frequency of the three-input converter 104. At some points, $d_{po}$ is equal to $d_{on}$, which results in a three-level output voltage $v_{xy}$ at the output terminals of the three-input converter 104. Therefore, the mathematical analysis is done for two periods—which include Sector-I ($v_{po} > v_{on}$) and Sector-II ($v_{po} < v_{on}$), as shown in FIG. 3. The first sector is when $v_{po}$ is decreasing and $v_{on}$ is increasing and the second sector is when $v_{po}$ is increasing and $v_{on}$ is decreasing. The fundamental components of the primary voltage ($v_{xy1}$) and the primary current ($i_{xy1}$) are given by:

$$v_{xy1} = \frac{4}{\pi}\left[v_{po}\sin\left(\frac{\pi d_{po}}{2}\right) + v_{on}\sin\left(\frac{\pi d_{on}}{2}\right)\right]\sin(\omega_s t), \quad (1)$$

$$i_{xy1} = I_{Lsm}\sin(\omega_s t - \Psi), \quad (2)$$

where $\omega_s$ is the angular switching frequency, $I_{Lsm}$ is the amplitude of the fundamental component of primary current, and $\psi$ is the phase angle of fundamental current of $i_{xy1}$ with respect to the fundamental voltage of $v_{xy1}$. The expressions for $d_{on}$ and $d_{on}$ are derived by equating the values of $i^p_{dc}$ and $i^n_{dc}$ averaged over one switching cycle to the instantaneous values of $i_p$ and $i_n$ respectively as presented in Table I.

TABLE I

| | Calculation of $d_{po}$ and $d_{on}$ for sectors I and II | |
|---|---|---|
| Parameter | Sector-I $\left(0 < \theta_{grid} < \frac{\pi}{3}\right)$ | Sector-II $\left(\frac{\pi}{3} < \theta_{grid} < \frac{2\pi}{3}\right)$ |
| vpo | $V_m\sin\left(\theta_{grid} + \frac{2\pi}{3}\right)$ | $V_m\sin\left(\theta_{grid} - \frac{\pi}{3}\right)$ |
| von | $V_m\sin(\theta_{grid})$ | $V_m\sin\left(\theta_{grid} + \frac{\pi}{3}\right)$ |
| $< idcp > Ts$ $= ip$ | $\frac{2I_{Lsm}\cos\psi}{\pi}\sin\left(\frac{\pi d_{po}}{2}\right) = I_m\cos(\theta_{grid})$ | $\frac{2I_{Lsm}\cos\psi}{\pi}\sin\left(\frac{\pi d_{po}}{2}\right) = I_m\sin\left(\theta_{grid} - \frac{\pi}{6}\right)$ |
| $< idcn > Ts$ $= in$ | $\frac{2I_{Lsm}\cos\psi}{\pi}\sin\left(\frac{\pi d_{on}}{2}\right) = I_m\sin\left(\theta_{grid} + \frac{\pi}{6}\right)$ | $\frac{2I_{Lsm}\cos\psi}{\pi}\sin\left(\frac{\pi d_{on}}{2}\right) = I_m\sin\left(\theta_{grid} + \frac{\pi}{6}\right)$ |
| dpo | $\frac{2}{\pi}\sin^{-1}(M\cos(\theta_{grid}))$ | $\frac{2}{\pi}\sin^{-1}\left(M\sin\left(\theta_{grid} - \frac{\pi}{6}\right)\right)$ |
| don | $\frac{2}{\pi}\sin^{-1}\left(M\sin\left(\theta_{grid} + \frac{\pi}{6}\right)\right)$ | $\frac{2}{\pi}\sin^{-1}\left(M\sin\left(\theta_{grid} + \frac{\pi}{6}\right)\right)$ |

M is the modulation index given by $$M = \frac{V_{xy1(rms)}}{V_{xy1(rms)max}} = \frac{V_{xy1(rms)}\pi}{\sqrt{6}V_m} = \frac{I_m\pi}{2I_{Lsm}\cos(\psi)}. \quad (3)$$

Figure 5:
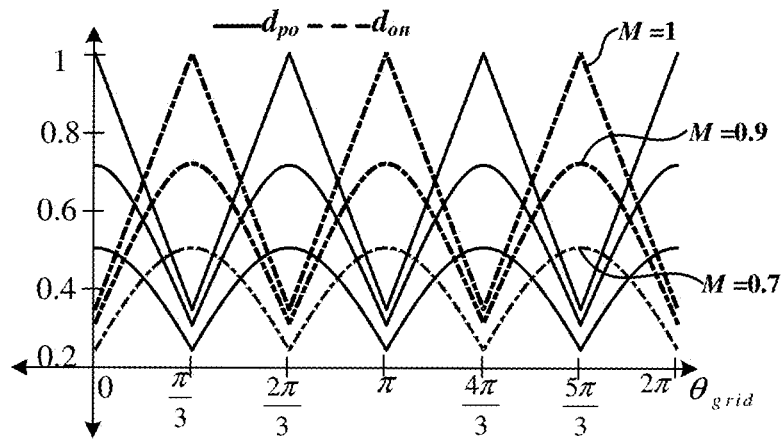
FIG. 5 are waveforms of the first duty ratio $d_{po}$ and the second duty ratio $d_{on}$ for different modulation indexes M.

The duty ratios depend on the modulation index (M) and the grid phase angle ($\theta_{grid}$). A plot of $d_{po}$ and $d_{on}$ for various modulation indexes is given in FIG. 5. The leading edges of the five-level $v_{xy}$ voltage waveform, as shown in FIG. 4, are hard-switched for a certain portion of the grid cycle.

A region of converter soft switching is dependent on the phase angle $\psi$ of the primary current ($I_{Pri}$) and the modulation index (M). The higher the M, the higher is the soft-switching region of the three-input converter 104 over the grid cycle. Detuning the resonant tank to be inductive helps in achieving soft switching over the majority portion of the grid cycle when operated at M closer to one. At lower M, the leading edges of the output voltage $v_{xy}$ are hard switched, similar to a phase-shift controlled inverter in a two-stage converter. Soft switching enables higher overall system efficiency compared to a two-stage conversion, which has losses in both the PFC stage and the inverter stage.

From equation (1), it can be seen that the voltage $v_{xy1}$ depends on both $d_{po}$ and $d_{on}$. However, $d_{po}$ and $d_{on}$ are decoupled through M. This presents an easier control of power without sensing the DC-link currents $i_p$ and $i_n$. The control loop shown in FIG. 2 has a proportional-integral ("PI") compensator that processes the error in the battery power and generates the modulation index (M). In other embodiments, other compensators are used. M and the grid phase angle ($\theta_{grid}$) are used to calculate $d_{po}$ and $d_{on}$ and generate the PWM signals for the three-input converter 104. The proposed method does not require DC-link current sensing. If the phase-locked loop PLL 108 is implemented by sensing the grid voltages instead of the unfolder phase voltages, grid currents will lag the voltages by a small angle due to the voltage drop across the grid filter inductor $L_g$. To eliminate the impact of the power conversion stage non-idealities on the input power factor, a feedback method with an inner DC current regulation loop along with the decoupling terms may be used.

III. Simulation Results

Figure 6:
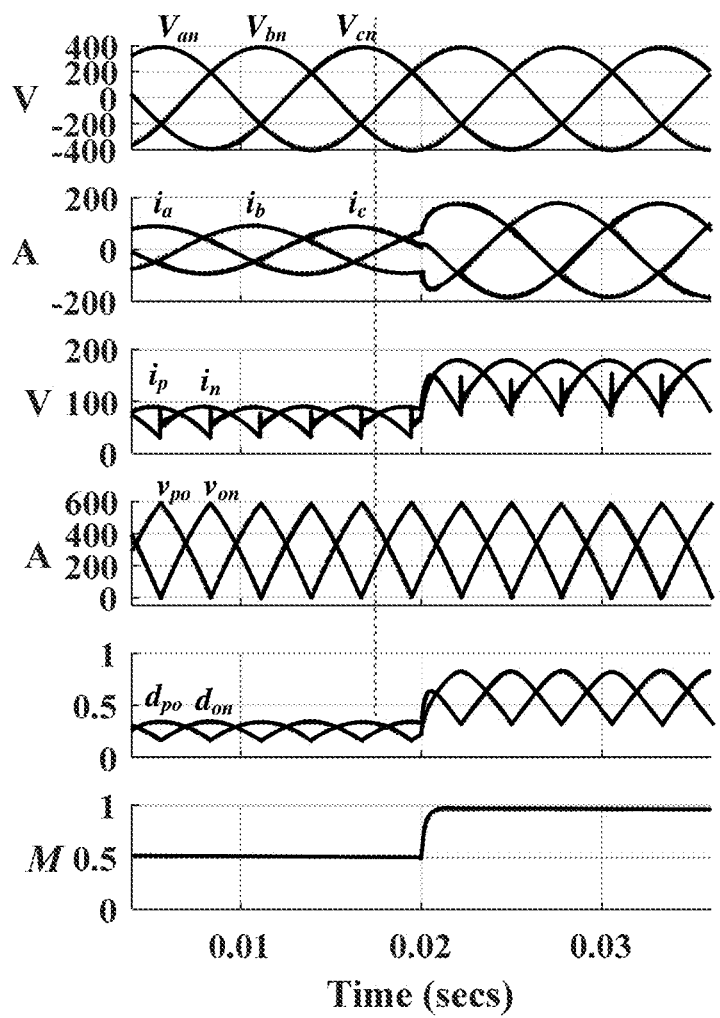
FIG. 6 is a waveform diagram of a simulation result for a step load change from 50 kW to 100 kW.
Figure 7:
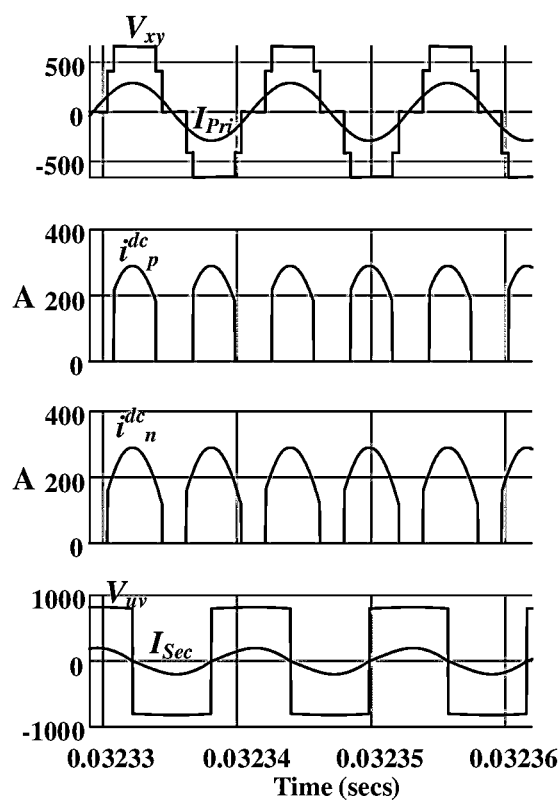
FIG. 7 is a waveform diagram of simulation results of a three-input converter at 100 kW.

The WPT circuit in FIG. 2 is simulated in Piecewise Linear Electrical Circuit Simulation ("PLECS"®) with the parameters listed in Table II. The simulation results presented in FIG. 6 demonstrate unity-power-factor operation of the system. The simulation results for a step-change in battery power from 50 kW to 100 kW at t=0.02 seconds are presented in FIG. 6. The system settles within 1 milliseconds ("ms") as seen from the plot of the modulation index. Distortions in the DC-link currents $i_p$ and $i_n$ at the sector transitions can be seen from FIG. 6. This effect is seen in all unfolder-based topologies. The distortions are due to the ripple in the soft DC-link voltages $v_{po}$ and $v_{on}$, which results in undesired conduction of body diodes of the switches of the unfolder 102 of the commutating phase during the sector transition. The distortion in the grid currents at the sector transitions corresponds to the underdamped ringing of the grid inductance with the DC-link capacitance. The waveforms corresponding to the WPT system 200 are shown in FIG. 7 and include waveforms of the three-input converter 104 and rectification section 204.

TABLE II

Simulation parameters of the converter 100 of Figure 2

| Parameter | Value |
|---|---|
| Nominal input voltage | 480 V (1-1), 60 Hz AC 3-Φ |
| Maximum Output power | 100 kW |
| Switching frequency ($f_s$) | 85 kHz |
| Primary inductance ($L_{Pri}$) | 27.92 μH |
| Secondary inductance ($L_{Sec}$) | 27.92 μH |
| Mutual inductance ($M_{PS}$) | 6.62 μH |
| Coupling coefficient (k) | 0.237 |
| Nominal battery voltage | 800 V |
| Capacitances Cp and Cn | 30 μF |
| Grid filter inductance (Lg) | 5 μH |
| Filter capacitance (Cf) | 150 μF |

IV. Experimental Results

A 1 kW scaled-down prototype of the AC-AC power converter 100 was developed in a laboratory to validate the proposed topology and the modulation strategy. The WPT system 200 in FIG. 2 was implemented in hardware without the secondary coil, rectification stage and the battery as the focus was to demonstrate the PFC action and voltage control of the front-end converter (e.g. 100). To emulate the battery load, a resistor equals to the reflected resistance of the WPT system 200 was connected in series with the primary coil $L_{Pri}$. The series resistance-inductance-capacitance ("RLC") load (R, $C_{p1}$, $L_{Pri}$ in Table III) was tuned to 20 degrees lagging power factor to aid soft switching. A Pacific Power 390-ASX power supply was used to emulate the three-phase source 106. The unfolder 102 and the three-input converter 104 were implemented using Cree SiC devices C3M0120100J (1000 V/22 A/120 mΩ). For unidirectional power transfer, the unfolder switches $Q_{a1}$, $Q_{a2}$, $Q_{b1}$, $Q_{b2}$, $Q_{c1}$, and $Q_{c2}$ can be realized using power diodes. The mid-point switches $Q_{a3}$, $Q_{b3}$, and $Q_{c3}$ can be realized by inexpensive IGBTs due to the low frequency switching of the unfolder stage. The parameters of the hardware setup are given in Table III.

The modulation strategy was implemented in a Texas Instruments® F28379D microcontroller using feed-forward control. During the transition instant between Sector-I ($d_{po}<d_{on}$) and Sector-II ($d_{po}<d_{on}$), extra care was taken in the software to avoid momentary shoot-through of the top and bottom devices in the three-input converter 104. The selected solution was to force the PWM controller 112 into the starting state of the new sector, when the sector change is detected. The compare register values of the new sector are then loaded into enhanced PWM ("EPWM") registers. Calculation of the $d_{po}$ and $d_{on}$ functions was computationally intensive due to the arcsin function, which required 18.5 microseconds ("μs") of processing time. The control algorithm was implemented at a rate of 17 kHz, which is five times slower than the switching frequency of 85 kHz.

TABLE III

Parameters of the hardware setup

| Parameter | Value |
|---|---|
| Input voltage | 128 V (1-1), 60 Hz AC 3-ph |
| Output power | 1 kW |
| Switching frequency ($f_s$) | 85 kHz |
| Primary inductance ($L_{Pri}$) | 89.92 μH |
| Primary capacitance ($C_{P1}$) | 48.86 nF |
| Reflected resistance (R) | 17.1 Ω |
| Capacitances $C_p$ and $C_n$ | 1.5 μF |
| Grid filter inductance ($L_g$) | 30 μH |
| Modulation index (M) | 1 |

Figure 8:
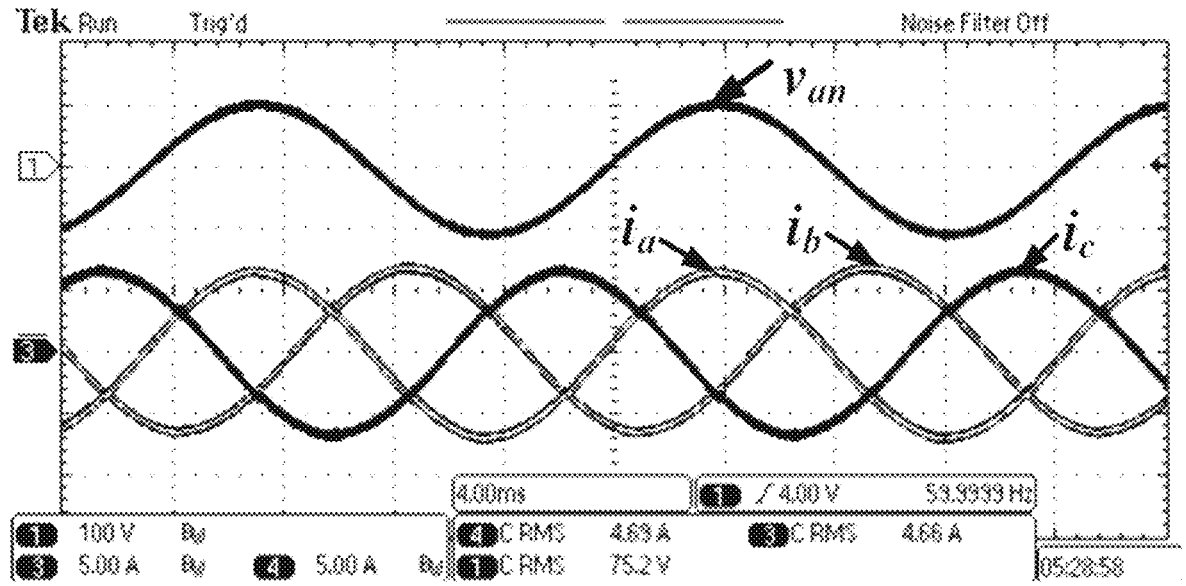
FIG. 8 is a plot of experimental results of phase voltage ($v_{on}$), and balanced three-phase line currents ($i_a$, $i_b$ and $i_c$) at 1 kW output power where the power factor is 0.99 and the total harmonic distortion is 1.4%.
Figure 9:
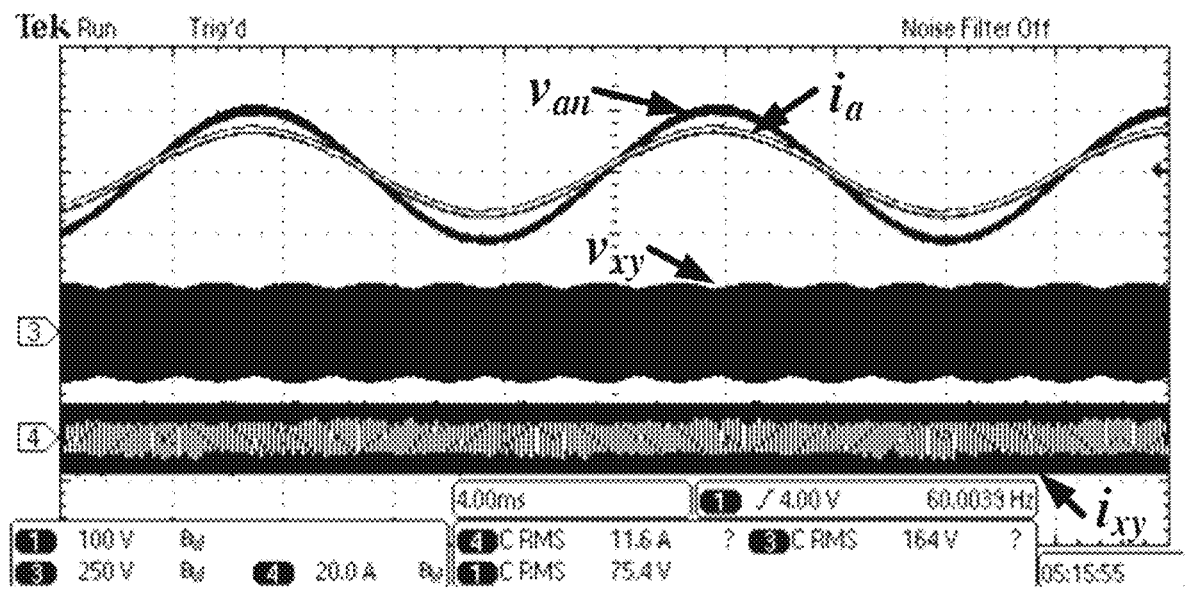
FIG. 9 is a plot of experimental results of voltages and currents at the input of the unfolder ($v_{an}$, $i_a$) and at the output of the three-phase converter ($v_{xy}$, $I_{xy}$) demonstrating power factor correction and output voltage and current control.
Figure 10:
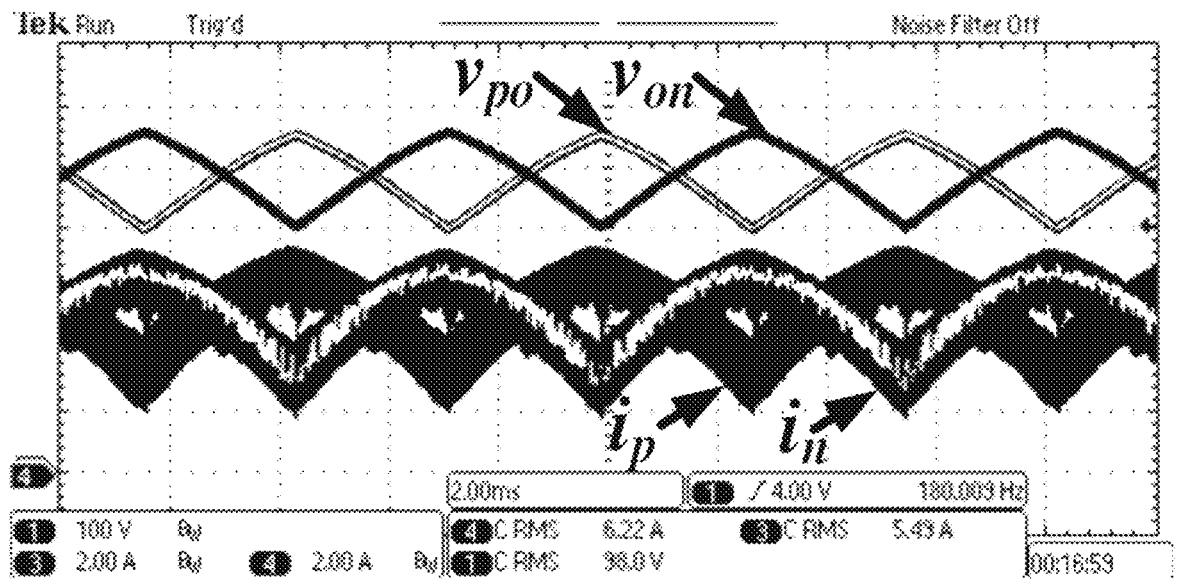
FIG. 10 is a plot of experimental results of soft DC-link voltages ($v_{po}$, $v_{on}$) and currents ($i_p$, $i_n$)

The three-phase ac line currents of the inverter at 1 kW output power are shown in FIG. 8. An efficiency of 95% from the grid to the resistive load was achieved at this operating point. An input power factor of 0.99 and a grid current total harmonic distortion ("THD") of 1.4% was measured using a Yokogawa WT1806E power analyzer. The PFC action as well as the tank voltage $v_{pn}$ and current control are illustrated in FIG. 9. The 360 Hz envelope of the tank voltage ($v_{pn}$) is also shown in FIG. 9. The 180 Hz soft DC link voltages $v_{po}$, $v_{on}$ and currents $i_p$, $i_n$ are illustrated in FIG. 10. The soft DC-link currents $i_p$, $i_n$ have high ripple due to the lower value of DC-link capacitances $C_p$, $C_n$ used in the hardware.

Figure 11:
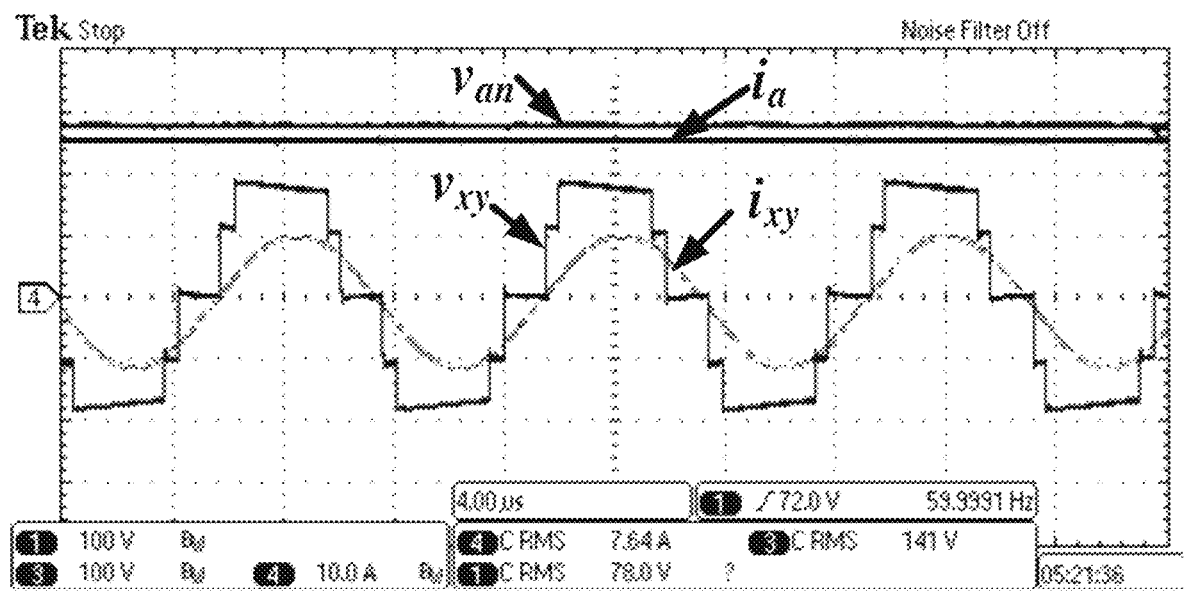
FIG. 11 is a plot of experimental results of a five-level output voltage of the three-input converter ($v_{xy}$) at unequal first duty ratio $d_{po}$ and $d_{on}$ values.
Figure 12:
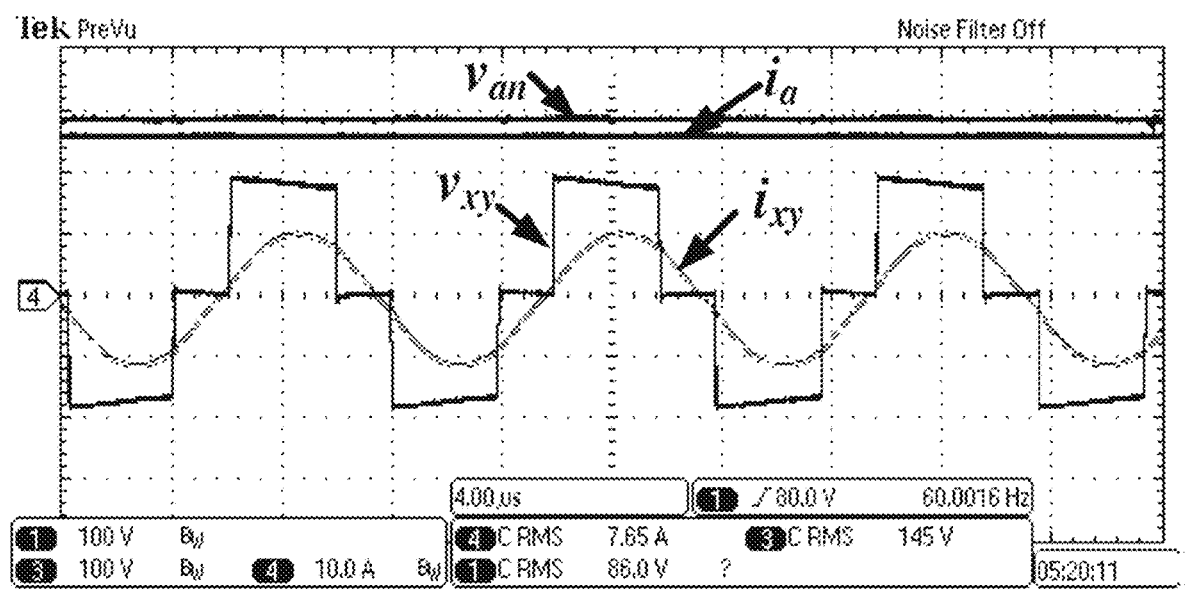
FIG. 12 is a plot of experimental results of a five-level output voltage of the three-input converter ($v_{xy}$) at equal first duty ratio $d_{po}$ and $d_{on}$ values.

The 5-level waveform of the tank voltage under unequal $d_{po}$ and $d_{on}$ values is given in FIG. 11. When $d_{po}$ and $d_{on}$ are equal, the tank voltage has a 3-level waveform as shown in FIG. 12. As seen in FIG. 11 and FIG. 12, the leading edges are hard-switched at very low currents and the trailing edges are completely soft switched. At higher modulation indexes, the proposed topology depicted in FIGS. 1 and 2 can achieve soft switching over a major portion of the grid cycle. Hence, the proposed topology can achieve a higher efficiency compared to a conventional two-stage system or a matrix converter based system. Furthermore, the proposed topology requires a very small grid filter due to the low voltage ripple on the grid filter inductor and hence more compact components.

Single-stage AC-AC converters have the potential to improve the efficiency and power density of the WPT systems. A control scheme for an AC-AC conversion system utilizing a three-phase unfolder 102 and three-input converter 104 is described herein. The mathematical analysis of the proposed modulation scheme and the simulation results for a 100 kW WPT system demonstrating the efficacy of the proposed control scheme is presented herein. Hardware results of a 1 kW scaled-down hardware prototype demonstrate the effectiveness of the proposed topology. The hardware system achieved a power factor of 0.99 with a grid current THD well under 2%. The proposed topology offers a clear advantage over the two-stage system and matrix converter in terms of grid current quality, filtering requirement, and system efficiency.

Figure 13:
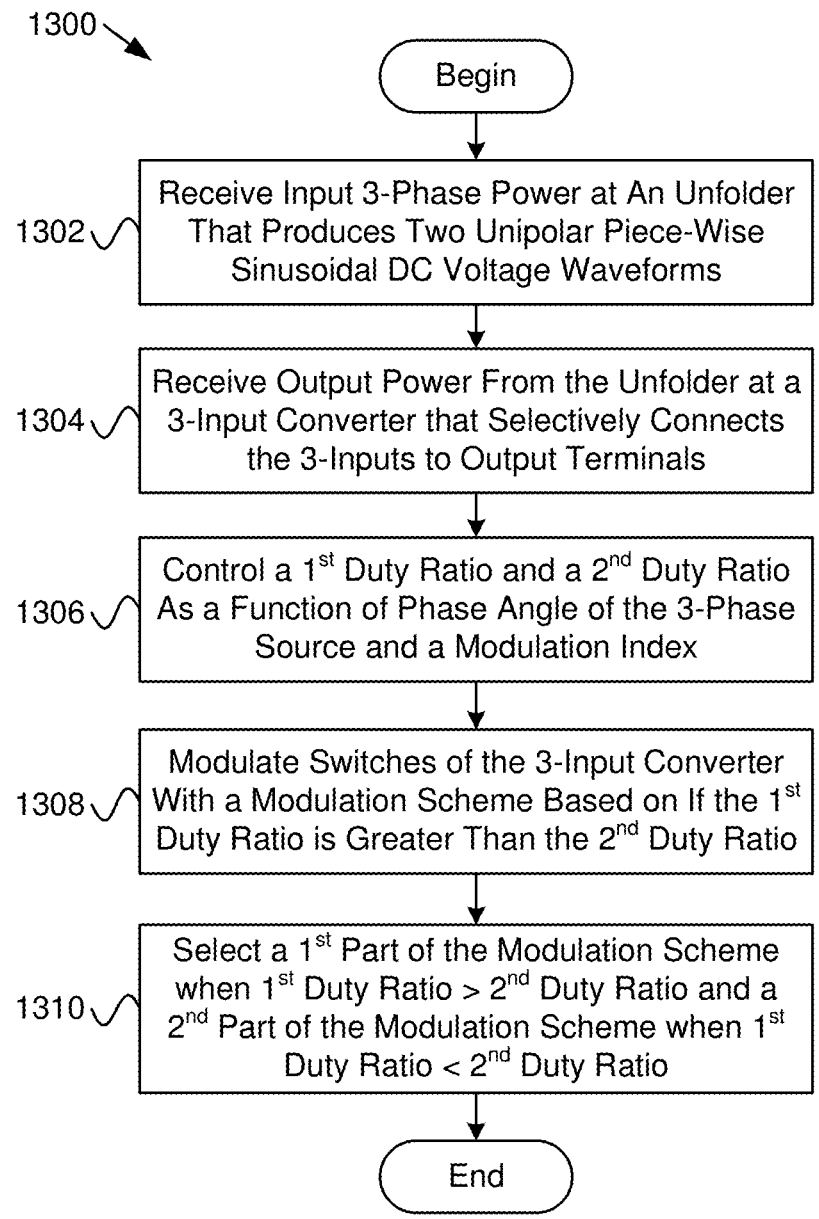
FIG. 13 is a schematic flowchart diagram illustrating one embodiment of a method for using an unfolder-based single-stage AC to AC converter.

FIG. 13 is a schematic flowchart diagram illustrating one embodiment of a method 1300 for using an unfolder-based single-stage AC to AC converter. The method 1300 begins and receives 1302 input power at three input terminals of an unfolder 102. The three input terminals receive 1302 the power from a three-phase AC power source 106 and the unfolder 102 includes an output connection with a positive terminal p, a negative terminal n and a neutral terminal o. The unfolder 103 unfolds bipolar AC voltages into two unipolar piece-wise sinusoidal DC voltage waveforms offset from each other by a half of a period. The method 1300 receives 1304 output power from the unfolder 102 at a three-input converter 104 that produces a quasi-sinusoidal output voltage across output terminals at an output frequency. The three-input converter 104 receives the output power at a positive input connection connected to the positive terminal p, a negative input connection connected to the negative terminal n and a neutral input connection connected to the neutral terminal o. The three-input converter 104 includes switches that selectively connect the positive, negative and neutral input connections across the output terminals.

The method 1300 controls 1306, with a pulse-width modulation controller 112, a first duty ratio $d_{po}$ and a second duty ratio $d_{on}$ for the three-input converter 104 as a function of a phase angle $\theta_{grid}$ of a phase of the three-phase AC power source 106 and a modulation index M generated from an error signal related to a control variable compared to a reference. The method 1300, in some embodiments, modulates 1308, using the PWM controller 112, switches of the three-input converter 104 according to a modulation scheme that depends on the first duty ratio $d_{po}$ and the second duty ratio $d_{on}$, and the method 1300 selects 1310 a first part of the modulation scheme when $d_{po}$ is greater than $d_{on}$ and a second part of the modulation scheme when $d_{on}$ is greater than $d_{po}$, and the method 1300 ends. The modulation scheme includes switching of the switches of the three-input converter 104 to produce a positive output voltage at the output terminals during a first half of a switching period of the three-input converter 104 and to produce a negative output voltage at the output terminals during a second half of a switching period of the three-input converter 104. In various embodiments, the method 1300 is implemented with the power converter 100 of FIG. 1 or 2.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A power converter comprising:
an unfolder comprising an input connection comprising three input terminals that connect to a three-phase alternating current ("AC") power source and comprising an output connection with a positive terminal, a negative terminal and a neutral terminal, wherein the unfolder unfolds bipolar AC voltages into two unipolar piece-wise sinusoidal direct current ("DC") voltage waveforms offset from each other by a half of a period;
a three-input converter that produces a quasi-sinusoidal output voltage across output terminals at an output frequency, the three-input converter comprising a positive input connection connected to the positive terminal, a negative input connection connected to the negative terminal and a neutral input connection connected to the neutral terminal, wherein the three-input converter comprises switches that selectively connect the positive, negative and neutral input connections across the output terminals; and
a pulse-width modulation controller configured to control a first duty ratio $d_{po}$ and a second duty ratio $d_{on}$ for the three-input converter as a function of a phase angle of a phase of the three-phase AC power source and a modulation index generated from an error signal related to a control variable compared to a reference,
wherein the first duty ratio $d_{po}$ and the second duty ratio $d_{on}$ are time varying at a rate related to a fundamental frequency of the three-phase AC power source, and
wherein the modulation index relates to output voltage of the three-input converter, a peak voltage of the three-phase AC power source, a peak current of the three-phase AC power source and/or a peak current of output current at the output terminals.

2. The power converter of claim 1, wherein a modulation scheme for switches of the three-input converter depends on the first duty ratio $d_{po}$ and the second duty ratio $d_{on}$.

3. The power converter of claim 2, wherein the modulation scheme comprises a first modulation scheme when $d_{po}$ is greater than $d_{on}$ and a second modulation scheme when $d_{on}$ is greater than $d_{po}$.

4. The power converter of claim 2, wherein the modulation scheme comprises switching of the switches of the three-input converter to produce a positive output voltage at the output terminals during a first half of a switching period of the three-input converter and to produce a negative output voltage at the output terminals during a second half of a switching period of the three-input converter.

5. The power converter of claim 1, wherein equations defining the first duty ratio $d_{po}$ and the second duty ratio $d_{on}$ comprise first sector equations for a first sector and second sector equations for a second sector, wherein the first sector is when voltage from the positive terminal to the neutral terminal $v_{po}$ is decreasing and voltage from the neutral terminal to the negative terminal $v_{on}$ is increasing and the second sector is when $v_{po}$ is increasing and $v_{on}$ is decreasing.

6. The power converter of claim 5, wherein first and second sector equations for the first duty ratio $d_{po}$ and the second duty ratio $d_{on}$ are defined as:

$$d_{po} = \frac{2}{\pi}\sin^{-1}(M \cos\theta_{grid})$$

for the first sector;

$$d_{po} = \frac{2}{\pi}\sin^{-1}\left(M \cos\left(\theta_{grid} - \frac{\pi}{6}\right)\right)$$

for the second sector;

$$d_{on} = \frac{2}{\pi}\sin^{-1}(M \sin(\theta_{grid}))$$

for the first sector; and $$d_{on} = \frac{2}{\pi}\sin^{-1}\left(M \sin\left(\theta_{grid} - \frac{\pi}{6}\right)\right)$$

for the second sector,
wherein:
$\theta_{grid}$ is the phase angle of the phase of the three-phase AC power source, and
M is the modulation index.

7. The power converter of claim 1, wherein the modulation index M is:

$$M = \frac{V_{xy1(rms)}}{V_{xy1(rms)max}} = \frac{V_{xy1(rms)}\pi}{\sqrt{6}\, V_m} = \frac{I_m \pi}{2 I_{Lsm}\cos(\psi)}$$

wherein:
$V_{xy1(rms)}$ is a root-mean-square ("rms") voltage and is the output voltage of the three-input converter;
$V_{xy1(rms)max}$ is a maximum rms voltage of the three-input converter;
$V_m$ is the peak voltage of the three-phase AC power source;
$I_m$ is the peak current of the three-phase AC power source;
$I_{Lsm}$ is the peak current of output current at the output terminals; and
$\psi$ is the phase angle between the fundamental components of $v_{xy}$ and $i_{xy}$.

8. The power converter of claim 1, wherein the pulse-width modulation controller controls switching of the three-input converter to maintain unity power factor at the input to the unfolder.

9. The power converter of claim 1, wherein a switching frequency of the three-input converter is at least two orders of magnitude higher than a fundamental frequency of the three-phase AC power source.

10. The power converter of claim 1, wherein $d_{po}$ and $d_{on}$ are centered at a phase angle of 90 degrees of a switching period of the three-input converter for a positive output voltage at the output terminals and are centered at a phase angle of 270 degrees of the switching period of the three-input converter for a negative output voltage at the output terminals.

11. The power converter of claim 1, wherein the output terminals of the three-input converter are connected to a resonant section, which connects to a rectification section and an output of the rectification section is a DC voltage and the control variable is for controlling the output of the rectification section.

12. The power converter of claim 11, wherein one of:
the resonant section comprises a transmission pad separated from a receiver pad on a mobile device, wherein the transmission pad transfers power over a gap to the receiver pad as part of a wireless power transmission system;
the resonant section comprises a transformer and the power converter is a DC power supply; and
the resonant section comprises output terminals and the power converter is an inverter.

13. A system comprising:
an unfolder comprising an input connection comprising three input terminals that connect to a three-phase alternating current ("AC") power source and comprising an output connection with a positive terminal, a negative terminal and a neutral terminal, wherein the unfolder unfolds bipolar AC voltages into two unipolar piece-wise sinusoidal direct current ("DC") voltage waveforms offset from each other by a half of a period;
a three-input converter that produces a quasi-sinusoidal output voltage across output terminals at an output frequency, the three-input converter comprising a positive input connection connected to the positive terminal, a negative input connection connected to the negative terminal and a neutral input connection connected to the neutral terminal, wherein the three-input converter comprises switches that selectively connect the positive, negative and neutral input connections across the output terminals;
a wireless power transfer ("WPT") primary pad coupled to output terminals of the three-input converter;
a WPT secondary pad electromagnetically coupled to the WPT primary pad over a gap;
a rectifier section coupled to an output of the WPT secondary pad, the rectifier section comprising an output; and
a pulse-width modulation controller configured to control a first duty ratio $d_{po}$ and a second duty ratio $d_{on}$ for the three-input converter as a function of a phase angle of a phase of the three-phase AC power source and a modulation index generated from an error signal related to a converter output variable compared to a reference, the converter output variable from the output of the rectifier section,
wherein the first duty ratio $d_{po}$ and the second duty ratio $d_{on}$ are time varying at a rate related to a fundamental frequency of the three-phase AC power source, and
wherein the modulation index relates to output voltage of the three-input converter, a peak voltage of the three-phase AC power source, a peak current of the three-phase AC power source and/or a peak current of output current at the output terminals.

14. The system of claim 13, wherein a modulation scheme for switches of the three-input converter depends on the first duty ratio $d_{po}$ and the second duty ratio $d_{on}$, the modulation scheme comprises a first modulation scheme when $d_{po}$ is greater than $d_{on}$ and a second modulation scheme when $d_{on}$ is greater than $d_{po}$, and the modulation scheme comprises switching of the switches of the three-input converter to produce a positive output voltage at the output terminals during a first half of a switching period of the three-input converter and to produce a negative output voltage at the output terminals during a second half of a switching period of the three-input converter.

15. The system of claim 13, wherein equations defining the first duty ratio $d_{po}$ and the second duty ratio $d_{on}$ comprise first sector equations for a first sector and second sector equations for a second sector, wherein the first sector is when voltage from the positive terminal to the neutral terminal $v_{po}$ is decreasing and voltage from the neutral terminal to the negative terminal $v_{on}$ is increasing and the second sector is when $v_{po}$ is increasing and $v_{on}$ is decreasing.

16. The system of claim 15, wherein first and second sector equations for the first duty ratio $d_{po}$ and the second duty ratio $d_{on}$ are defined as:

$$d_{po} = \frac{2}{\pi}\sin^{-1}(M\,\cos\theta_{grid})$$

for the first sector;

$$d_{po} = \frac{2}{\pi}\sin^{-1}\left(M\,\cos\left(\theta_{grid} - \frac{\pi}{6}\right)\right)$$

for the second sector;

$$d_{on} = \frac{2}{\pi}\sin^{-1}(M\,\sin(\theta_{grid}))$$

for the first sector; and $$d_{on} = \frac{2}{\pi}\sin^{-1}\left(M\,\sin\left(\theta_{grid} - \frac{\pi}{6}\right)\right)$$

for the second sector,
wherein:
$\theta_{grid}$ is the phase angle of the phase of the three-phase AC power source, and
M is the modulation index, and
wherein the modulation index M is:

$$M = \frac{V_{xy1(rms)}}{V_{xy1(rms)max}} = \frac{V_{xy1(rms)}\pi}{\sqrt{6}\,V_m} = \frac{I_m\pi}{2I_{Lsm}\cos(\psi)}$$

wherein:
$V_{xy1(rms)}$ is a root-mean-square ("rms") voltage and is the output voltage of the three-input converter;
$V_{xy1(rms)max}$ is a maximum rms voltage of the three-input converter;
$V_m$ is the peak voltage of the three-phase AC power source;
$I_m$ is the peak current of the three-phase AC power source;
$I_{Lsm}$ is the peak current of output current at the output terminals; and
$\psi$ is the phase angle between the fundamental components of $v_{xy}$ and $i_{xy}$.

17. The system of claim 13, wherein the output variable comprises one of output power, output voltage and output current of the rectification section.

18. A method comprising:
receiving input power at three input terminals of an unfolder, the three input terminals receive the power from a three-phase alternating current ("AC") power source and, the unfolder comprises an output connection with a positive terminal, a negative terminal and a neutral terminal, wherein the unfolder unfolds bipolar AC voltages into two unipolar piece-wise sinusoidal direct current ("DC") voltage waveforms offset from each other by a half of a period;
receiving output power from the unfolder at a three-input converter that produces a quasi-sinusoidal output voltage across output terminals at an output frequency, the three-input converter receives the output power at a positive input connection connected to the positive terminal, a negative input connection connected to the negative terminal and a neutral input connection connected to the neutral terminal, wherein the three-input converter comprises switches that selectively connect the positive, negative and neutral input connections across the output terminals; and
controlling, with a pulse-width modulation controller, a first duty ratio $d_{po}$ and a second duty ratio $d_{on}$ for the three-input converter as a function of a phase angle of a phase of the three-phase AC power source and a modulation index generated from an error signal related to a control variable compared to a reference,
wherein the first duty ratio $d_{po}$ and the second duty ratio $d_{on}$ are time varying at a rate related to a fundamental frequency of the three-phase AC power source, and
wherein the modulation index relates to output voltage of the three-input converter, a peak voltage of the three-phase AC power source, a peak current of the three-phase AC power source and/or a peak current of output current at the output terminals.

19. The method of claim 18, further comprising modulating switches of the three-input converter according to a modulation scheme that depends on the first duty ratio $d_{po}$ and the second duty ratio $d_{on}$, wherein the method selects a first part of the modulation scheme when $d_{po}$ is greater than $d_{on}$ and a second part of the modulation scheme when $d_{on}$ is greater than $d_{po}$, and wherein the modulation scheme comprises switching of the switches of the three-input converter to produce a positive output voltage at the output terminals during a first half of a switching period of the three-input converter and to produce a negative output voltage at the output terminals during a second half of a switching period of the three-input converter.

20. The method of claim 18, wherein equations defining the first duty ratio $d_{po}$ and the second duty ratio $d_{on}$ comprise first sector equations for a first sector and second sector equations for a second sector, wherein the first sector is when voltage from the positive terminal to the neutral terminal $v_{po}$ is decreasing and voltage from the neutral terminal to the negative terminal $v_{on}$ is increasing and the second sector is when $v_{po}$ is increasing and $v_{on}$ is decreasing.

* * * * *